(No Model.) 6 Sheets—Sheet 3.
F. S. McWHORTER.
SEEDER.
No. 504,500. Patented Sept. 5, 1893.
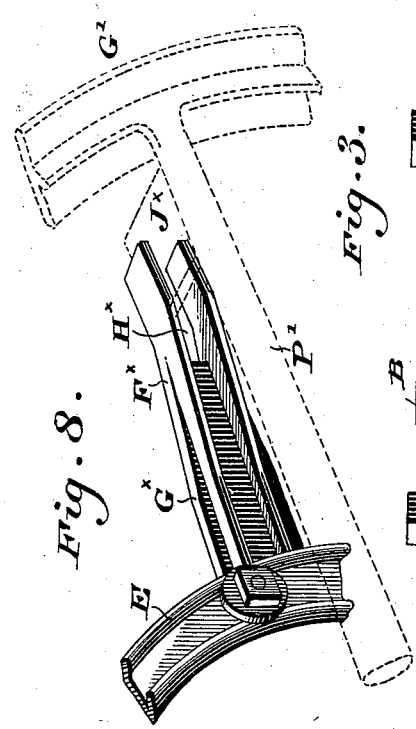
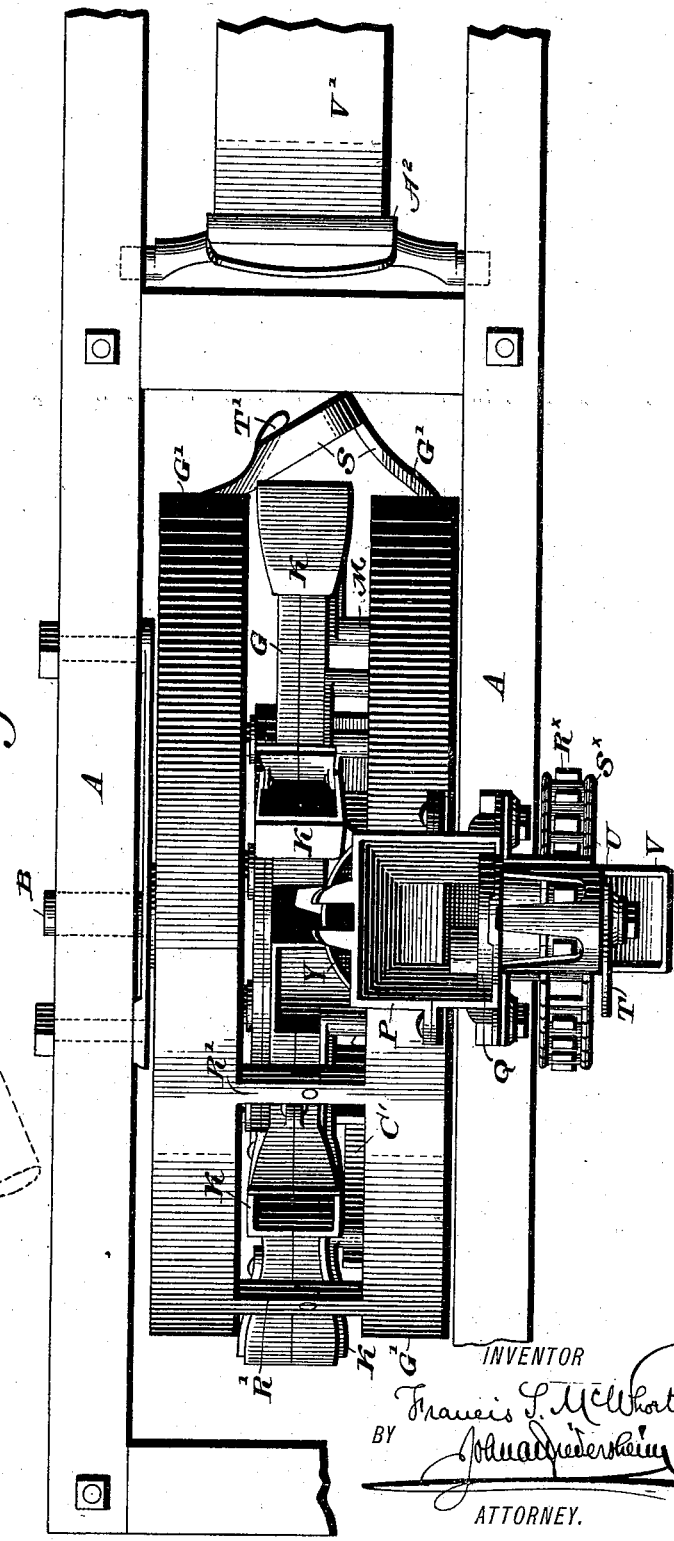
WITNESSES:
P. F. Eagle.
L. Donville.
INVENTOR
Francis S. McWhorter
BY John a. Niederstein
ATTORNEY.

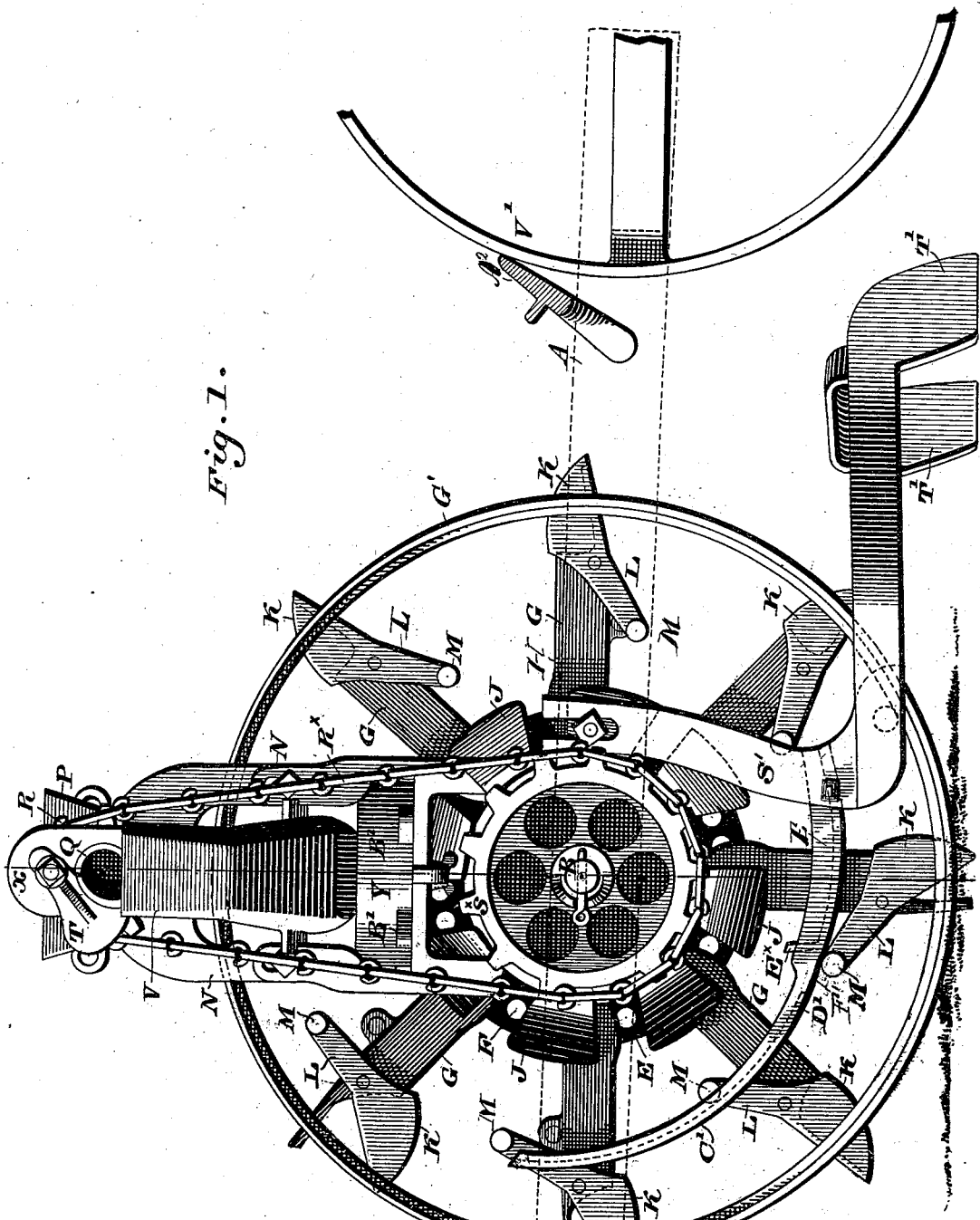

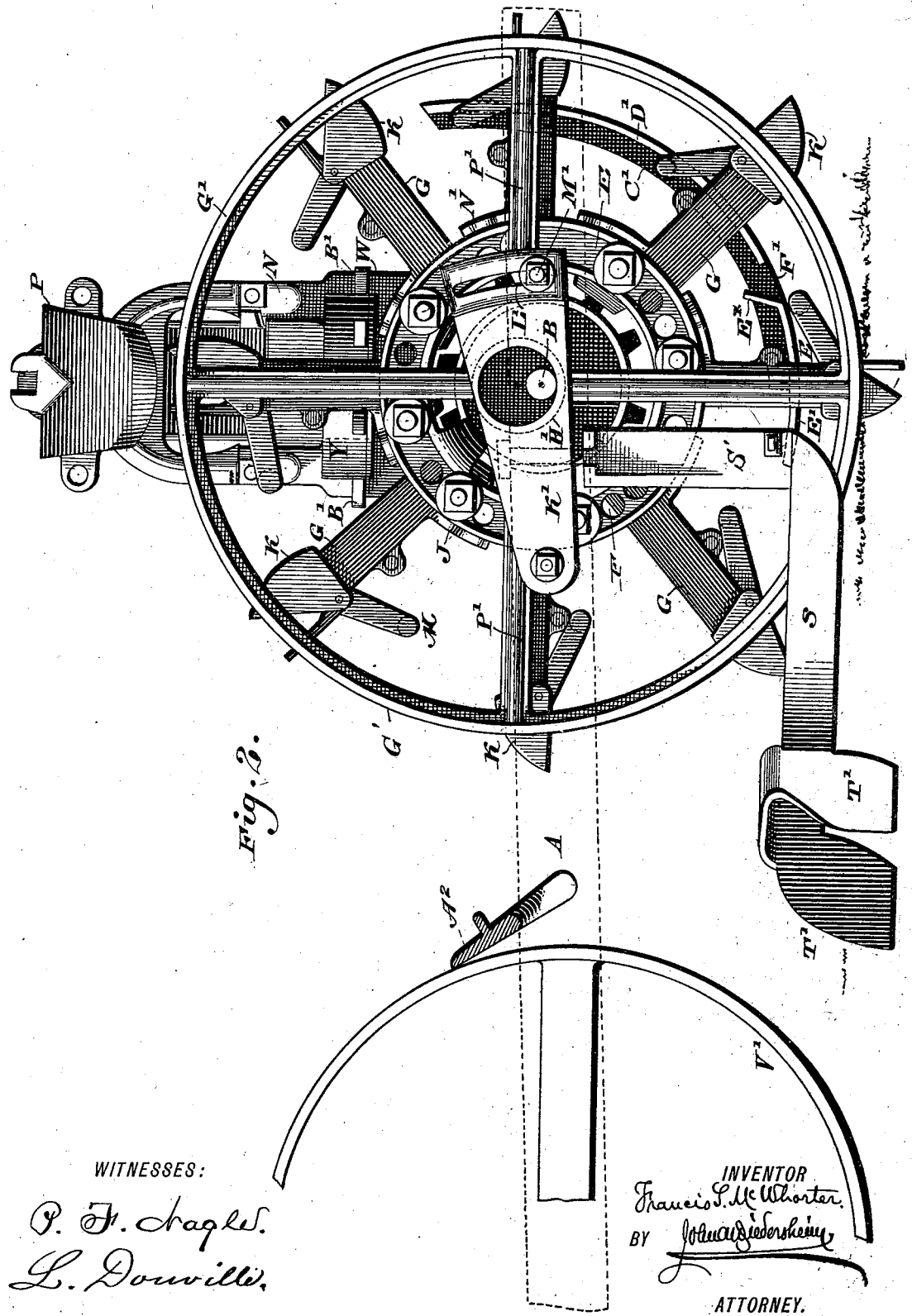

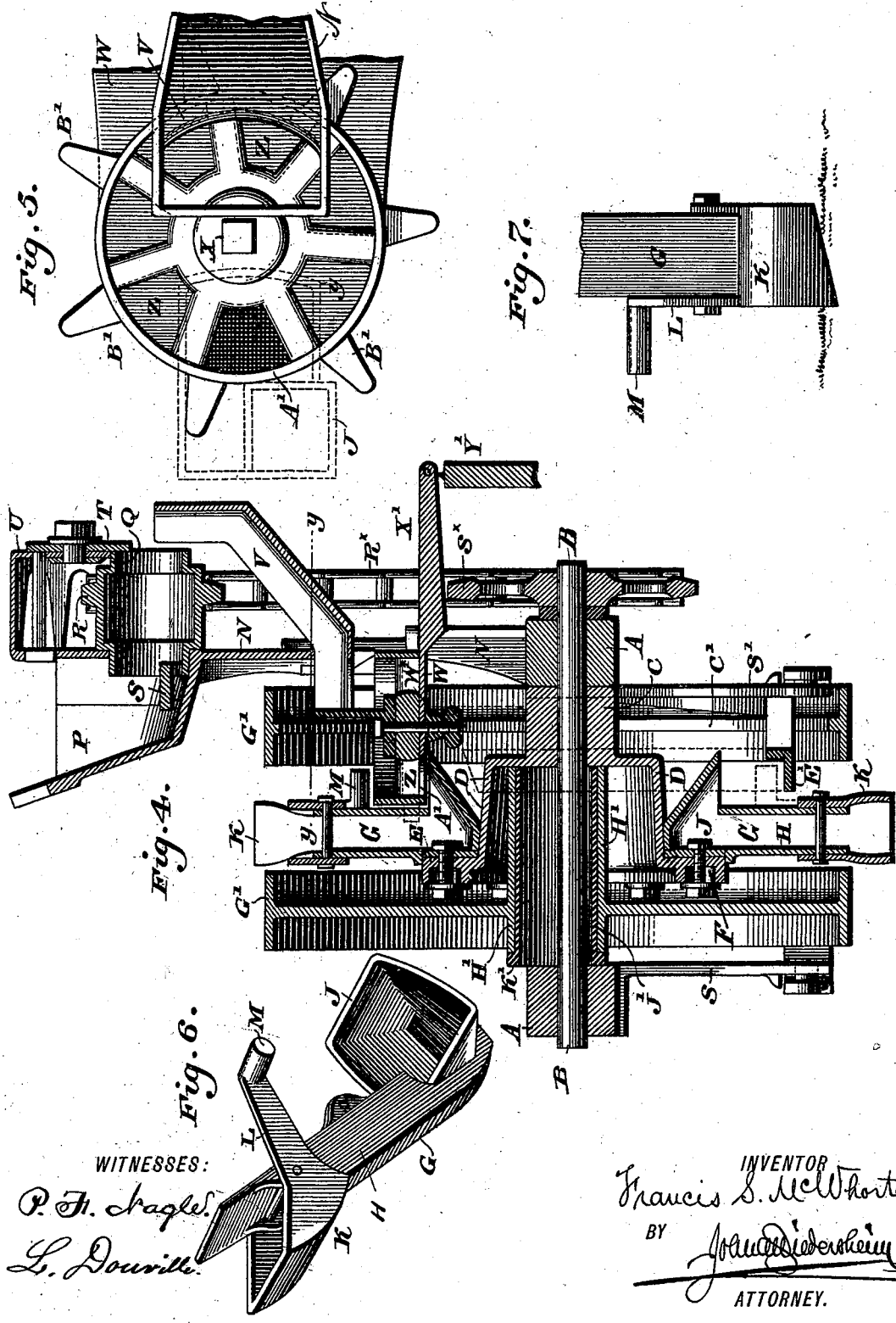

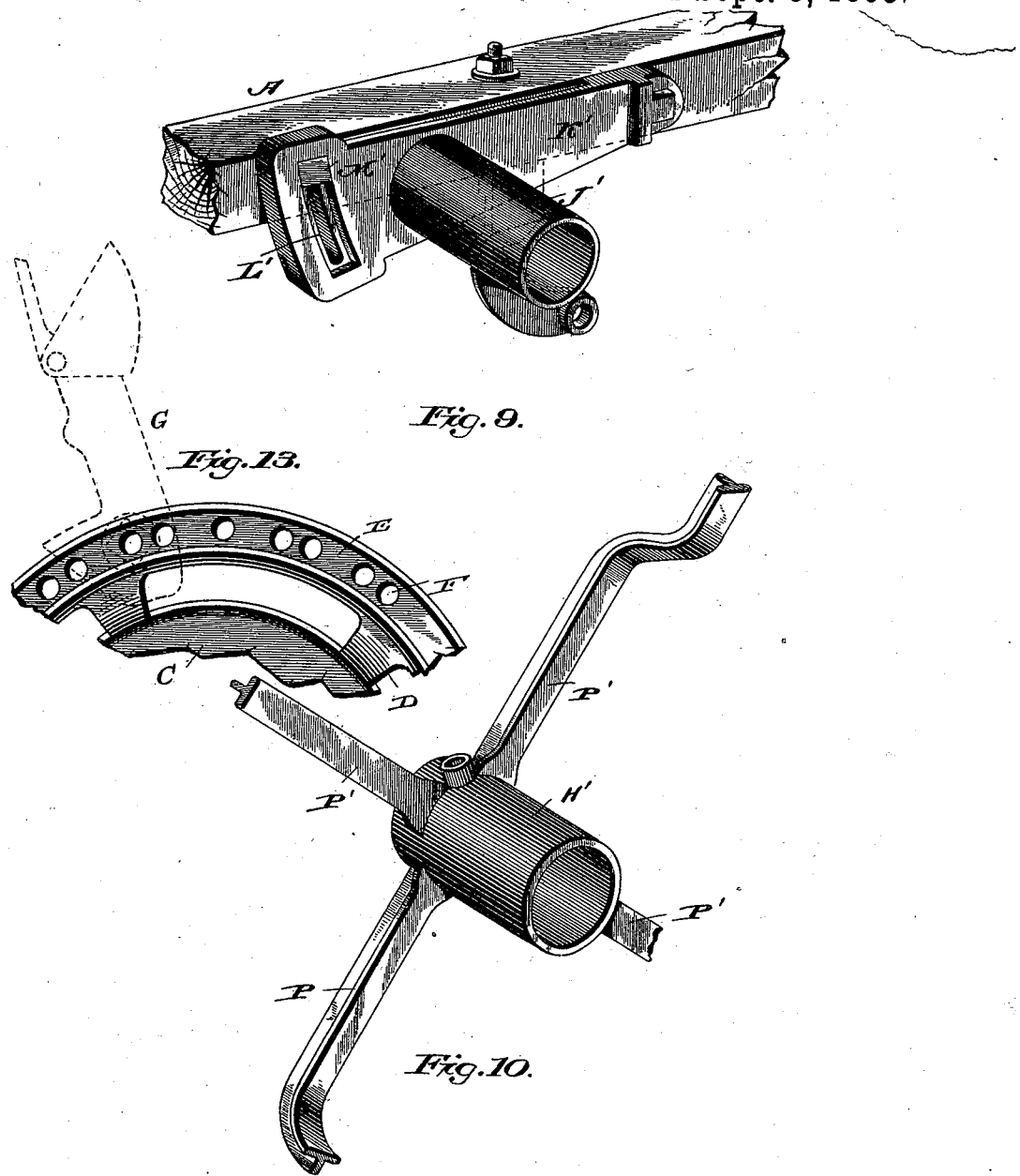

(No Model.)
F. S. McWHORTER.
SEEDER.
No. 504,500. Patented Sept. 5, 1893.
6 Sheets—Sheet 6.
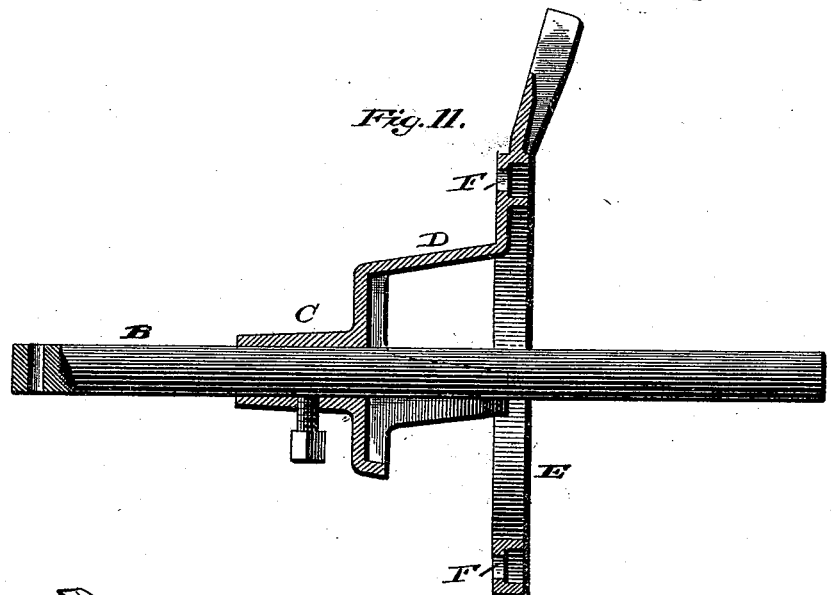
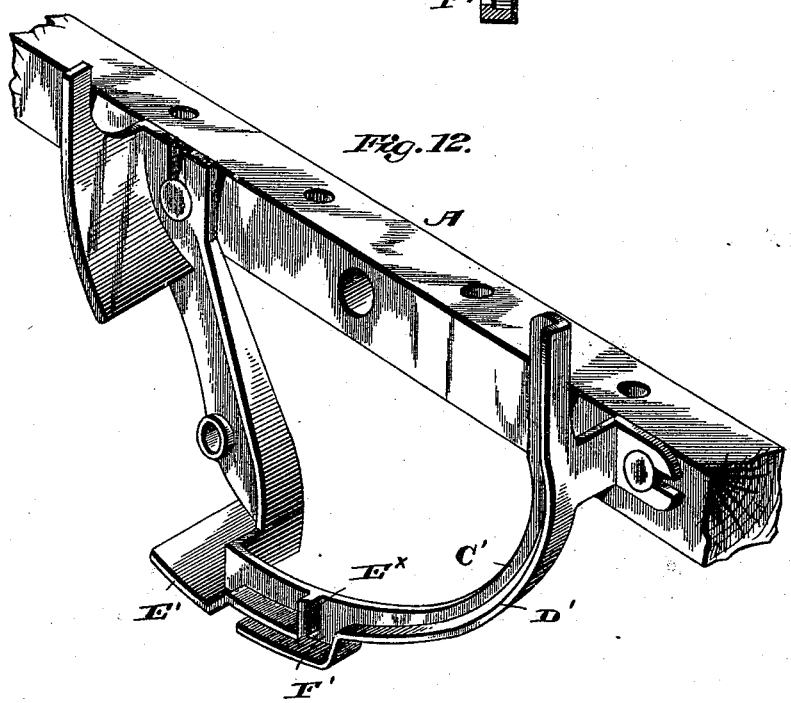
Witnesses:
Inventor:
Francis S. McWhorter.
By
Attorney.

UNITED STATES PATENT OFFICE.

FRANCIS S. McWHORTER, OF NORFOLK, VIRGINIA.

SEEDER.

SPECIFICATION forming part of Letters Patent No. 504,500, dated September 5, 1893.

Application filed October 24, 1891. Serial No. 409,642. (No model.)

*To all whom it may concern:*

Be it known that I, FRANCIS S. MCWHORTER, a citizen of the United States, residing in the city and county of Norfolk, State of Virginia, have invented a new and useful Improvement in Seeders, which improvement is fully set forth in the following specification and accompanying drawings.

My invention relates to improvements in seeders, and has for its object the construction of an implement by which different seed can be reliably planted at proper distances and depths and in suitable quantities.

For this purpose it consists:—First, of a feeding device whereby the seed can be reliably fed in suitable quantities to a delivering or dropping wheel.

It further consists of mechanism for dropping the seeds at prearranged distances.

It further consists of mechanism for planting the seed at prearranged depths.

It further consists of mechanism adapted to deposit the seed at different depths in the same hill.

It further consists of a novel carrying wheel extending on both sides of the dropping wheel, as hereinafter set forth.

It further consists of the combination and arrangement of parts hereinafter set forth.

Figure 1 represents a side view of a portion of the seeder, the frame being removed to show the operative parts of the device more clearly. Fig. 2 represents a view of the opposite side of the part of the machine shown in Fig. 1. Fig. 3 represents a top or plan view of the same parts. Fig. 4 represents a vertical transverse section, on line $x, x$, Fig. 1. Fig. 5 represents a horizontal section on line $y, y$, Fig. 4. Fig. 6 represents a perspective view of a detail portion of the machine. Fig. 7 represents a view of a modification of a detail portion of a dropping arm of the machine. Fig. 8 represents a perspective view of a detail portion of the machine. Fig. 9 represents a perspective view of a portion of the machine showing the adjustable plate with the cylinder on which the hub of the carrying wheel is mounted. Fig. 10 represents a perspective view of the hub and adjacent portions of the carrying wheel. Fig. 11 represents a sectional view of a portion of the hub of the planting wheel with its shaft. Fig. 12 represents a perspective view of the segmental guide-way for the arms of the carrying wheel, showing its position on the frame of the machine. Fig. 13 represents a side view of a portion of the ring to which the adjustable arms of the carrying wheel are attached.

Similar letters of reference indicate corresponding parts in the several figures.

Referring to the drawings: A designates the frame of the seeder, consisting of side bars and cross pieces of wood or other suitable material.

Journaled in the side bars of the frame is a rotatable shaft B, on which a hub C is secured, so as to rotate therewith. The hub C is provided with horizontally projecting arms D, having a vertical ring or annulus E secured thereon, the latter having a series of openings or slots F. Secured to one side of said ring by screw bolts and nuts, are the planting arms G, each consisting of a hollow main portion or stem H, a receiving cup J, and a pivoted lip K on its discharging end, the plate or lip K having an arm L with a pin M projecting from the side thereof.

On a standard N, supported on one of the side bars of the frame A, is mounted a hopper or receptacle P, in which the seed to be planted is placed, and from which it is fed to the proper parts of the machine.

In the outer wall of the hopper, and in a plate U or frame attached thereto is journaled a hollow cylinder Q, which forms a hub for a sprocket wheel R, the said cylinder being provided on its inner end with an arm S projecting into the hopper. The sprocket wheel R is connected by a sprocket chain $R^x$, with a sprocket wheel $S^x$ on the shaft B, whereby the rotation of the shaft B rotates said cylinder Q, thereby employing the arm S, as an agitator or stirrer for the seeds. The inner end of the said cylinder opens into the hopper, and the outer end has a gate or mouth piece T, which is pivotally attached to a frame U secured to one side of the hopper P, whereby the flow of the seed from the cylinder into a spout V below the same can be controlled. The said spout is secured at its lower end to a horizontal plate W of the standard N, by means of a bolt X, which passes through said plate, forming the axis of a rotatable feed disk Y, which rests on said plate W, and in which the spout empties.

Between a thumb nut on the lower end of the bolt X, and the plate W, is an elastic cushion W$^\times$, whereby the travel of the chamber on the plate is controlled.

The bottom of the feed disk Y is provided with a number of openings forming the pockets Z, the plate W serving as a bottom for the same, except when said pockets register, in the rotation of the feed disk with an opening A′ in the plate immediately over the path of travel of the receiving cups J of the planting arms G. The feed disk Y has on its outer surface the projecting arms or studs B′, adapted to be engaged by the arms G in the rotation of the planting wheel, so as to rotate the said feed disk.

Secured to one of the side bars of the frame A and depending therefrom, is the segmental guide-way C′, having on its upper inner face a flange D′, and on its inner lower face a flange E′, with an upturned end E$^\times$ adjacent to the flange D′. An opening or space F′ of sufficient size to allow the passage therethrough of a pin M on the arm L of a pivoted lip K, intervenes between the adjacent ends of the said flanges.

To regulate the depth at which the seed is planted, the carrying wheel G′ of the machine, which rests on the ground on both sides of the planting wheel, has its hub H′ vertically adjustable, relatively to the shaft B on which the planting wheel is mounted, by means of the cylinder J′ on which it is mounted. The cylinder J′ has a plate K′ connected therewith, said plate being pivoted at one end to the frame A, and at the other end being provided with a slot L′, through which and the adjacent side bar of the frame, a bolt M′ passes. A clamping nut N′ working on a screw-threaded end of the bolt serves to hold the plate K′ and cylinder J′ in a fixed position, when the same are adjusted.

To allow the carrying wheel and the planting wheel to be adjusted relatively to each other, the sliding or loose connection F$^\times$ is provided, said connection causing the two wheels to revolve in unison, whether they are adjusted to the same center or not. The sliding connection F$^\times$ of the planting and carrying wheels is composed of an arm G$^\times$ secured to the ring E and projecting therefrom, and having a slot H$^\times$ in one end in which a projection J$^\times$ on the spokes P′ of the carrying wheel G′ is free to move in a direction to and from the axle or shaft B. The wheel G′ has its rim divided, so as to be on both sides of the planting arms G, whereby a broad supporting surface is had for the machine, and the planting arms G are prevented from penetrating the ground to any other than the required depth. The section of the rim of the wheel G′ on one side of the discharging arms is connected directly with the spokes P′, which extend from the hub H′, and the other section is connected with the first mentioned section by lapping arms R′ which extend from the said sections and are firmly bolted or riveted together, said arms being arranged at such distances as will not interfere with the adjustment of the distances apart of the arms G.

In the rear of the carrying wheel and connected with arms or hangers S′ on the frame A are the coverers T′, consisting of plates of any suitable material, arranged at an angle to each other, and adapted to travel in the path of the arms G, so as to throw a ridge of earth over the deposited seeds.

In the rear portion of the frame A, a wheel V′ is mounted, said wheel having a broad rim adapted to press down or pack the earth in which the seeds are planted.

The frame may be provided with handles for directing the machine over the ground, but as such are common, and as any form, either for pushing or hauling may be used, and as they are not claimed *per se*, the same are not shown in the drawings.

The operation of the device is as follows: The seeds to be planted are placed in the hopper P, the arms G adjusted on the ring E, according to the distance apart it is desired to plant the seed, and the cylinder J′ is moved relatively to the shaft B, so as to adjust the arms G for the depth of planting desired. As the wheel G′ is rotated by pushing or drawing the machine on the ground, the ring E carrying the arms G is revolved, so that when one of the arms G in its travel comes in contact with a stud B′ on the feeding disk Y, it rotates the said disk until a pocket Z therein has registered with the opening A′ in the plate W. In the meanwhile owing to the rotation of the shaft B, caused by the travel of the carrying and planting wheels, the sprocket wheels R and S$^\times$ with the chain R$^\times$, rotates the cylinder Q, so that the seed in the hopper is stirred and caused to flow therefrom, escaping from the cylinder at the gate T, which had been previously adjusted according as desired. The seed leaving the cylinder passes down the spout V, and enters the pockets of the chamber Y, which carries it as it rotates, to the opening A′, through which it enters the receiving cup J of a planting arm. As the ring E further rotates, the seeds in the trough are carried down the planting arm G into the discharging lip K, which closes by the contact of the pin M thereof with the upper side of the flange D′ on the segmental guide-way C′. At the time the lip K is inserted in the ground to the full extent, the pin M leaves the flange D′, and passing through the opening F′, rides against the lower side of the flange E′, whereby the pivoted lip K is tilted, so as to open the same, thereby dropping the seed in the lower end of the opening made in the earth by the said lip. As the ring further rotates, the lip is raised from the earth, passing around to receive its next complement of seed. The covering plates T′ draw the earth on the sides of the line of travel of the arms G together, so as to form a ridge above the seed, which the wheel V′ passes over, packing or pressing it so that the seed is better enabled to sprout than if the earth surrounding it was too loose.

For enabling the device to stand securely when at rest, either the frame or standard is provided with a projecting arm X', to the outer end of which is detachably connected a brace or supporting bar Y'. The pivoted lip K may be oblique at its outer end, as shown in Fig. 7, so as to be adapted to deposit the seed at different depths in the same hill. A scraper A² pivotally connected at its ends to the frame A, normally rests on the wheel V'.

Having thus described my invention, what I claim as new, and desire to secure by Letters Patent, is—

1. A seeder, having a frame with side and cross-bars a hub mounted on an axle journaled in said frame, planting arms adjustably connected with said hub, and a divided carrying wheel mounted on said hub, and an adjustable sleeve on said axle, said parts being combined substantially as described.

2. A seeder, having a frame, an axle mounted in said frame, a hub with planting arms thereon, a sleeve adjustable on said axles, and a carrying wheel extending on opposite sides of said arms and having a hub mounted on said sleeve, said parts being combined substantially as described.

3. A seeder, having a frame, a planting wheel, and an adjustable divided carrying wheel on opposite sides of said planting wheel with lapping arms connecting the sections of its rim, said parts being combined substantially as described.

4. A seeder having a frame, an axle journaled therein, a hub mounted on said axle, a ring secured to said hub, having a series of openings thereon, planting arms secured to said ring at said openings, and a feeding disk rotated by said arms, said parts being combined substantially as described.

5. A seeder having a frame, an axle journaled therein, a hub mounted on said axle, planting arms secured to said hub, and having pivoted lips with arms having the projections M thereon a depending guide-way secured to said frame having the flanges D' and E' on its upper and lower faces respectively with an opening between them, permitting the passage of the projection M, said parts being combined substantially as described.

6. A seeder having a frame, an axle journaled therein, a hub mounted on said axle, planting arms secured to said hub, each having a pivoted lip, means substantially as described for opening and closing said lip, a feeding disk rotated by said arms, a hopper with cylinder leading therefrom, and mechanism for rotating said cylinder connected with the axle of the hub carrying the arms, said parts being combined substantially as described.

7. A seeder having a frame, a hopper supported thereon, a frame secured to said hopper, a cylinder leading from said hopper and journaled in a wall of said hopper, and in said second frame, an axle journaled in said first frame, and mechanism substantially as described connected with said axle and said cylinder for rotating the latter, said parts being combined substantially as described.

8. A seeder having a frame, rotating planting arms and carrying wheel, a feeding disk, a coverer consisting of connected plates extending at an angle to each other, and a packing wheel in rear of the coverers, having a gravity scraper thereon, said parts being combined substantially as described.

9. A seeder having a frame with a seed feeding device mounted thereon, and a planting wheel journaled therein, an agitator in said feeding device, and mechanism connected with said agitator and the shaft of the planting wheel for operating the said agitator, said parts being combined substantially as described.

10. A frame, a rotatable planting wheel journaled therein, and consisting of arms having pivoted discharging lips, the latter being provided with arms with projections or pins thereon, and a guide-way with flanges having an intervening space, said parts being combined substantially as described.

11. A planting wheel consisting of a hub with a ring having openings therein, and arms adjustably connected with said rings and adapted to deposit the seed, substantially as described.

12. In a seeder, a horizontal feed cylinder with an agitator at one end and a regulating gate at the other, said cylinder being provided with mechanism connected therewith for rotating the same, substantially as described.

13. A seeder having a divided carrying wheel, planting arms secured to a hub and operating between the sections of the said carrying wheel, said carrying wheel being adjustable relative to said hub and planting arms, said parts being combined substantially as described.

14. A seeder having a rotatable shaft journaled in the side bars of the frame thereof, a hub secured on said shaft, a ring secured to the hub having planting arms thereon, the carrying wheel G' and the plate K' pivoted to the frame A and having the cylinder J', the hub of the carrying wheel being mounted on the said cylinder, said parts being combined substantially as described.

15. A seeder having carrying and planting wheels with a sliding connection consisting of an arm adapted at one end to be secured to one of said wheels, and provided at its other end with a slot in which a projection on a spoke of the other wheel is free to move, said parts being combined substantially as described.

FRANCIS S. McWHORTER.

Witnesses:
JOHN A. WIEDERSHEIM,
R. H. GRAESER.